US012604020B2

(12) United States Patent
Jin

(10) Patent No.: US 12,604,020 B2
(45) Date of Patent: Apr. 14, 2026

(54) VIDEO DECODING METHOD AND DECODER DEVICE

(71) Applicant: SigmaStar Technology Ltd., Xiamen (CN)

(72) Inventor: Tao Jin, Xiamen (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 0 days.

(21) Appl. No.: 18/815,980

(22) Filed: Aug. 27, 2024

(65) Prior Publication Data

US 2025/0126282 A1     Apr. 17, 2025

(30) Foreign Application Priority Data

Oct. 16, 2023     (CN) .......................... 202311333068.7

(51) Int. Cl.
| | |
|---|---|
| *H04N 19/423* | (2014.01) |
| *H04N 19/172* | (2014.01) |
| *H04N 19/44* | (2014.01) |
| *H04N 19/463* | (2014.01) |

(52) U.S. Cl.
CPC ......... *H04N 19/423* (2014.11); *H04N 19/172* (2014.11); *H04N 19/44* (2014.11); *H04N 19/463* (2014.11)

(58) Field of Classification Search
CPC .... H04N 19/423; H04N 19/172; H04N 19/44; H04N 19/463; G06T 1/20; G06T 1/60
See application file for complete search history.

(56) References Cited

U.S. PATENT DOCUMENTS

| | | | | |
|---|---|---|---|---|
| 2005/0058206 A1* | 3/2005 | Lim | ..................... | H04N 19/423 |
| | | | | 375/E7.095 |
| 2022/0408115 A1* | 12/2022 | Hendry | .................. | H04N 19/30 |

OTHER PUBLICATIONS

JVET-T2001 (Year: 2020).*

* cited by examiner

*Primary Examiner* — Shadan E Haghani
(74) *Attorney, Agent, or Firm* — Edell, Shapiro & Finnan, LLC

(57)     ABSTRACT

A video decoding method is applied to a decoder device to decode an encoded stream stored in memory. The decoder device includes a video decoder, a memory controller and a processor. The video decoding method includes: setting, by the memory controller, a decoded picture buffer in the memory according to a maximum number X of reference frames in the encoded stream, wherein the decoded picture buffer includes X+1 picture buffer areas, each picture buffer area is configured to store a decoded image, and X is a positive integer; determining an idle picture buffer area in the decoded picture according to status information of the decoded picture buffer; and controlling the video decoder to decode a current frame in the encoded stream to obtain a decoded image of the current frame and storing the decoded image of the current frame to the idle picture buffer area.

14 Claims, 12 Drawing Sheets

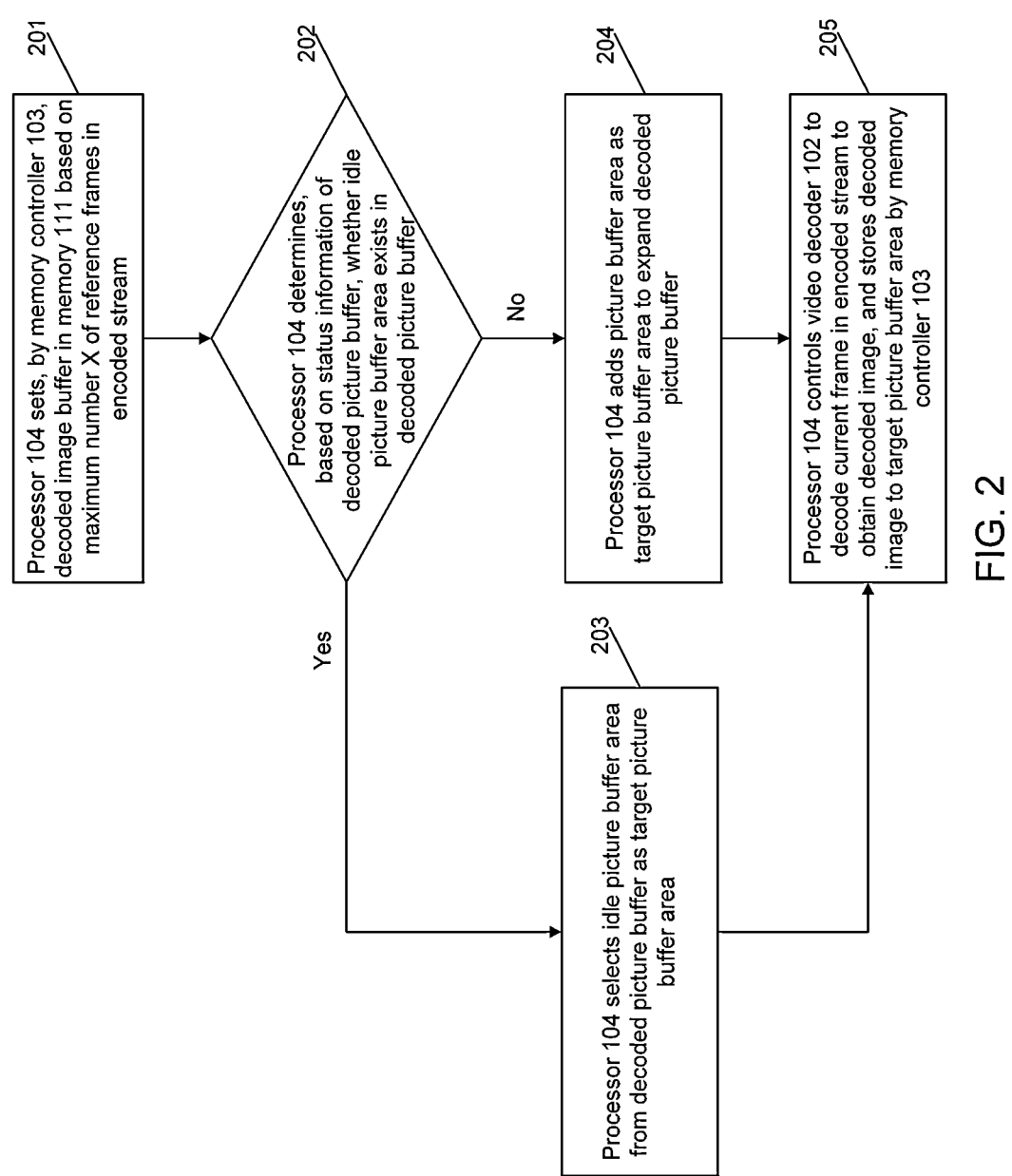

Processor 104 sets, by memory controller 103, decoded image buffer in memory 111 based on maximum number X of reference frames in encoded stream — 201

Processor 104 determines, based on status information of decoded picture buffer, whether idle picture buffer area exists in decoded picture buffer — 202

Yes

No

Processor 104 selects idle picture buffer area from decoded picture buffer as target picture buffer area — 203

Processor 104 adds picture buffer area as target picture buffer area to expand decoded picture buffer — 204

Processor 104 controls video decoder 102 to decode current frame in encoded stream to obtain decoded image, and stores decoded image to target picture buffer area by memory controller 103 — 205

FIG. 2

VIDEO DECODING METHOD AND DECODER DEVICE

This application claims the benefit of China application Serial No. CN202311333068.7, filed on Oct. 16, 2023, the subject matter of which is incorporated herein by reference.

BACKGROUND OF THE INVENTION

Field of the Invention

The present application relates to the technical field of video decoding, and more particularly to a video decoding method and a decoder device.

Description of the Related Art

A decoded picture buffer (DPB) is a storage area used for storing multiple frames having been decoded and to be used as reference frames for subsequent images. On the basis that decoding orders and display orders of backward reference frames are different, if characteristics of such reference frames are not fully taken into consideration during setting of a DPB, the DPB occupies a large storage space and increases costs of a decoder device.

SUMMARY OF THE INVENTION

In view of the drawbacks of the prior art, the present application provides a video decoding method and a decoder device so as to improve the prior art.

A video decoding method is provided according to an embodiment of the present application. The video decoding method is applied to a decoder device to decode an encoded stream stored in memory. The decoder device includes a video decoder, a memory controller and a processor. The video decoding method includes: setting, by the memory controller, a decoded picture buffer in the memory according to a maximum number X of reference frames in the encoded stream, wherein the decoded picture buffer includes X+1 picture buffer areas, each picture buffer area is configured to store a decoded image, and X is a positive integer; determining an idle picture buffer area in the decoded picture according to status information of the decoded picture buffer; and controlling the video decoder to decode a current frame in the encoded stream to obtain a decoded image of the current frame and storing the decoded image of the current frame to the idle picture buffer area.

A decoder device is further provided according to another embodiment of the present application. The decoder device includes a video decoder, a memory controller and a processor, and is configured to decode an encoded stream stored in a memory. The processor is configured to set a decoded picture buffer in the memory according to a maximum number X of reference frames in the encoded stream, wherein the decoded picture buffer includes X+1 picture buffer areas, each picture buffer area is configured to store a decoded image, and X is a positive integer. The processor is further configured to determine an idle picture buffer in the decoded picture according to status information of the decoded picture buffer. The processor is further configured to control the video decoder to decode a current frame in the encoded stream to obtain a decoded image of the current frame and store the decoded image of the current frame to the idle picture buffer area.

The video decoding method and the decoder device of the present application are capable of allocating buffer areas with high efficiency during a decoding process. Compared to the prior art, the video decoding method and the decoder device of the present application can more efficiently allocate buffer areas during a decoding process, hence effectively improving a utilization rate of buffer areas.

Features, implementations and effects of the present application are described in detail in preferred embodiments with the accompanying drawings below.

BRIEF DESCRIPTION OF THE DRAWINGS

To better understand the technical solutions of the embodiments of the present application, the embodiments are described in brief with the accompanying drawings below. It is obvious that the accompanying drawings in the description below provide merely some embodiments of the present application, and a person skilled in the art could arrive at other accompanying drawings on the basis of these accompanying drawings without involving inventive skills.

FIG. 2 is a flowchart of a video decoding method according to an embodiment of the present application;

DETAILED DESCRIPTION OF THE INVENTION

The technical terms given in the detailed description below are used with reference to conventional terms in the art. If some of the terms are described or defined in the present application, these terms are to be interpreted in accordance with the description and definitions given in the present application.

The disclosure of the present application includes a video decoding method and a decoder device. Some elements included in the decoder device of the present application may separately be known elements. Thus, without affecting the full disclosure or implementation feasibility of the device set forth, details of such known elements are omitted in the description below. Moreover, a part or all of a process of the video decoding method of the present application may be in the form of software and/or firmware, and may be performed by the decoder device of the present application or an equivalent device. Without affecting the full disclosure or implementation feasibility of the method set forth, the details associated with the method set forth by the present application are focused on steps rather than hardware.

Figure 1:
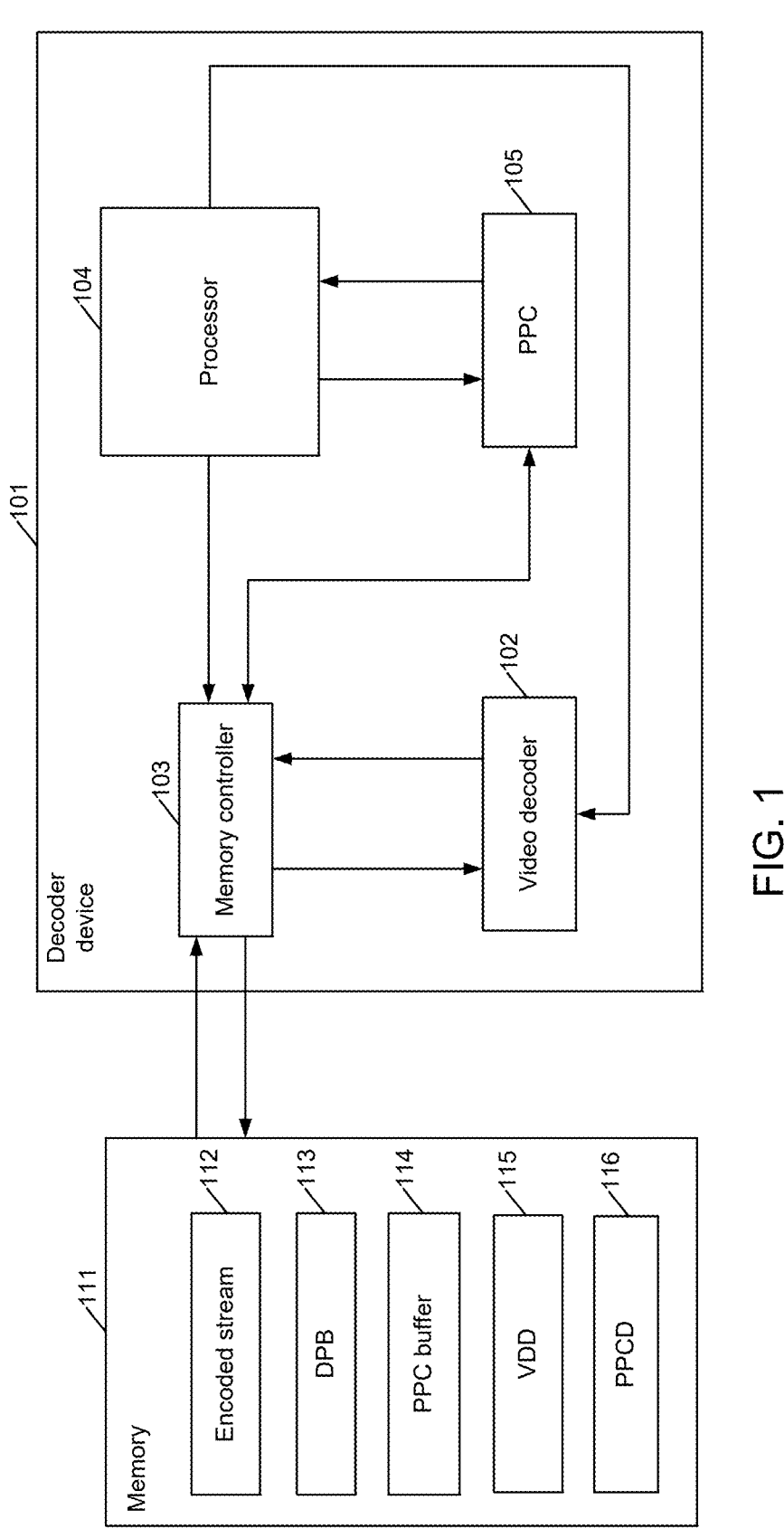
FIG. 1 is a structural schematic diagram of a decoder device according to an embodiment of the present application.

FIG. 1 shows a structural schematic diagram of a decoder device according to an embodiment of the present application. The decoder device 101 includes a video decoder (VD) 102, a memory controller 103 and a processor 104. The decoder 101 may be a decoder chip 101, and can decode data of an encoded stream (ES) stored in the memory 111. The memory controller 103 may be specifically implemented by a memory interface unit (MIU) and/or a direct memory access (DMA) circuit. The memory 111 has a video decoder driver (VDD) 115 stored therein, and the processor 104 reads the VDD 115 from the memory 111 by the memory controller 103 and executes the VDD 115, so as to control the video decoder 102 to decode the encoded stream 112.

A decoding process that the decoder device 101 performs on the encoded stream 112 is to be described in detail with reference to FIG. 2 and FIG. 3 below.

FIG. 2 shows a flowchart of a video decoding method according to an embodiment of the present application. The video decoding method includes the following steps.

In step S201, the processor 104 sets, by the memory controller 103, a decoded picture buffer (DPB) in the memory 111 according to a maximum number X of reference frames in the encoded stream.

More specifically, the processor 104 reads sequence parameter set (SPS) data of the encoded stream 112 from the memory (for example, a dynamic random access memory (DRAM)) 111 by the memory controller 103, analyzes the SPS data to obtain the maximum number (represented as "X") of reference frames in the encoded stream 112, and allocates a DPB 113 in the memory 111 for decoded images by the memory controller 103 according to the maximum number X of reference frames. In one embodiment, the DPB includes at least one X+1 picture buffer areas, each of which for storing one decoded image. The SPS data includes reference frame control information (RFCI) of each frame in the encoded stream and picture order count (POC) information of each decoded image.

In step S202, the processor 104 determines, according to status information of the DPB 113, whether an idle picture buffer area exists in the DPB 113. If so, step S203 is performed; if not, step S204 is performed.

The processor 104 obtains the status information of the DPB 113 according to stored tag information of each picture buffer area, wherein the tag information includes a POC tag and a reference frame tag, and the POC tag is used for indicating that a decoded image is used as a frame to be displayed and a picture order count thereof. When a decoded image is to be displayed, the POC tag of the decoded image of the decoded image is added; when the decoded image is displayed, the POC tag is cleared or modified to empty.

When a decoded image is to be used as a reference image of another image, the decoded image includes a reference frame tag; when the decoded image is not to be used as a reference image of another image, the reference frame tag is cleared or modified to empty. The status information of the DPB 113 includes tag information of each picture buffer area, and the tag information includes the POC tags and the reference frame tags of the decoded images in the image buffer areas. When both of the POC tag and the reference frame tag of a decoded image in the picture buffer area are cleared (for example, when tag values of both are empty), the processor 104 determines that the picture buffer area of the decoded image is in an idle state; when either of the POC tag and the reference frame tag of the decoded image exists (for example, when either of the tag values is not empty), the processor 104 determines that the picture buffer area (the tag information thereof is not empty) is in a non-idle state.

Before a frame in the encoded stream is decoded, the processor 104 determines, according to the status information (that is, the tag information of each picture buffer area) of the DPB 113, whether an idle picture buffer area exists in the DPB 113 so as to determine a target picture buffer area used for storing the decoded image of the frame. The target buffer area may be an idle picture buffer area in the DPB 113 (that is, the DPB 113 contains an idle picture buffer area), or may be a newly added picture buffer area on the basis of the DPB 113 (that is, the DPB 113 no longer contains an idle picture buffer area, and a picture buffer area is added to expand the DPB 113, so that the decoded image can be stored to the newly added picture buffer area of the DPB 113).

In a specific embodiment, the encoded stream 112 includes reference frame control information (RFCI) of each frame and a POC of a decoded frame thereof. The RFCI and POC of each frame are predetermined in the SPS data of the encoded stream 112. The processor 104 obtains the RFCI of the current frame (that is, which decoded images in DPB 113 are needed to decode the current frame), and updates the RFCI tags of decoded frames in the DPB 113 according to the RFCI (for example, clearing the RFCI tags of one or more decoded images) so as to identify an idle picture buffer area in the DPB 113 according to the updated RFCI tags and the POC tags. The processor 104 further obtains the POC of the current frame from the encoded stream 112 so as to add a POC tag corresponding to the target picture buffer area. The processor 104 further updates in real-time the POC tag according to display conditions of the decoded frames in the DPB 113.

In step S203, the processor 104 selects an idle picture buffer area from the DPB 113 as the target picture buffer area.

In step S204, the processor 104 adds a picture buffer area as the target picture buffer area so as to expand the DPB 113.

In step S205, the processor 104 controls the video decoder 102 to decode the current frame in the encoded stream so as to obtain the decoded image, and stores the decoded image to the target picture buffer area by the memory controller 103.

Once the target picture buffer area is determined, the video decoder 102 decodes the current frame to obtain the decoded image of the current frame, and stores the decoded image of the current frame to the target picture buffer area by the memory controller 103.

In some embodiments, the processor 104 may be a central processing unit (CPU) or a microcontroller unit (MCU), and is not specifically defined by the present application.

In some embodiments, the decoder device 101 further includes a post processing circuit (PPC) 105. The PPC 105 is controlled by the processor 104, and is configured to perform further post processing on the decoded image decoded by the video decoder 102, for example, performing processes such as resolution adjustment, rotation and scaling on the decoded image, and store the decoded image having undergone the processes to the memory 111 by the memory controller 103. Correspondingly, the memory 111 further includes a PPC buffer 114. The PPC buffer 114 is configured to store an image to be displayed, which is obtained by performing the post processing on the decoded image by the PPC 105. The memory 111 further has a post processing circuit driver (PPCD) 116 stored therein. The processor 104 controls, by reading and executing the PPCD 116 from the memory 111 by the memory controller 103, the PPC 105 to read the decoded image from the DPB 113 of the memory 113 by the memory controller 103, performs post processing on the decoded image, and then stores the image obtained by the post processing to the PPC buffer 114 by the memory controller 103.

More specifically, the processor 104 further obtains a maximum number (represented as Y) of reorder delay frames in the encoded stream 112 by analyzing the SPS data. During a decoding process, the processor 104 obtains the number of picture buffer areas with POC tags (or with values that are not empty) in the DPB 113 of the memory 111 by the memory controller 103. When the number is greater than the maximum number Y of reorder delay frames, the processor 104 determines the picture buffer area with the smallest POC (for example, the smallest tag value) of the DPB 113 according to the POC tags, controls the PPC 105 to read the decoded image from the picture buffer area, performs post processing on the decoded image, and then stores the image obtained by the post processing to the PPC buffer 114 by the memory controller 103.

In some embodiments, the SPS data is usually a first set of data of one encoded stream, or the same encoded stream may also include multiple sequences and the SPS data of each of the sequences is recorded in the first set of data of the encoded stream. Each SPS data includes syntax applicable to all frames in the same sequence, and primarily includes an identifier of the SPS, resolution, maximum number of reference frames, and maximum number of reorder delay frames.

It is clearly stated that, the decoder device 101 provided by the embodiments of the present application manages sizes of buffer spaces of the DPB 113 in real time according to the status information of the DPB 113. While ensuring normal decoding, the present application ensures the implementation of more efficient buffer allocation, decreases wastes in buffer areas, and reduces hardware costs.

Figure 3:
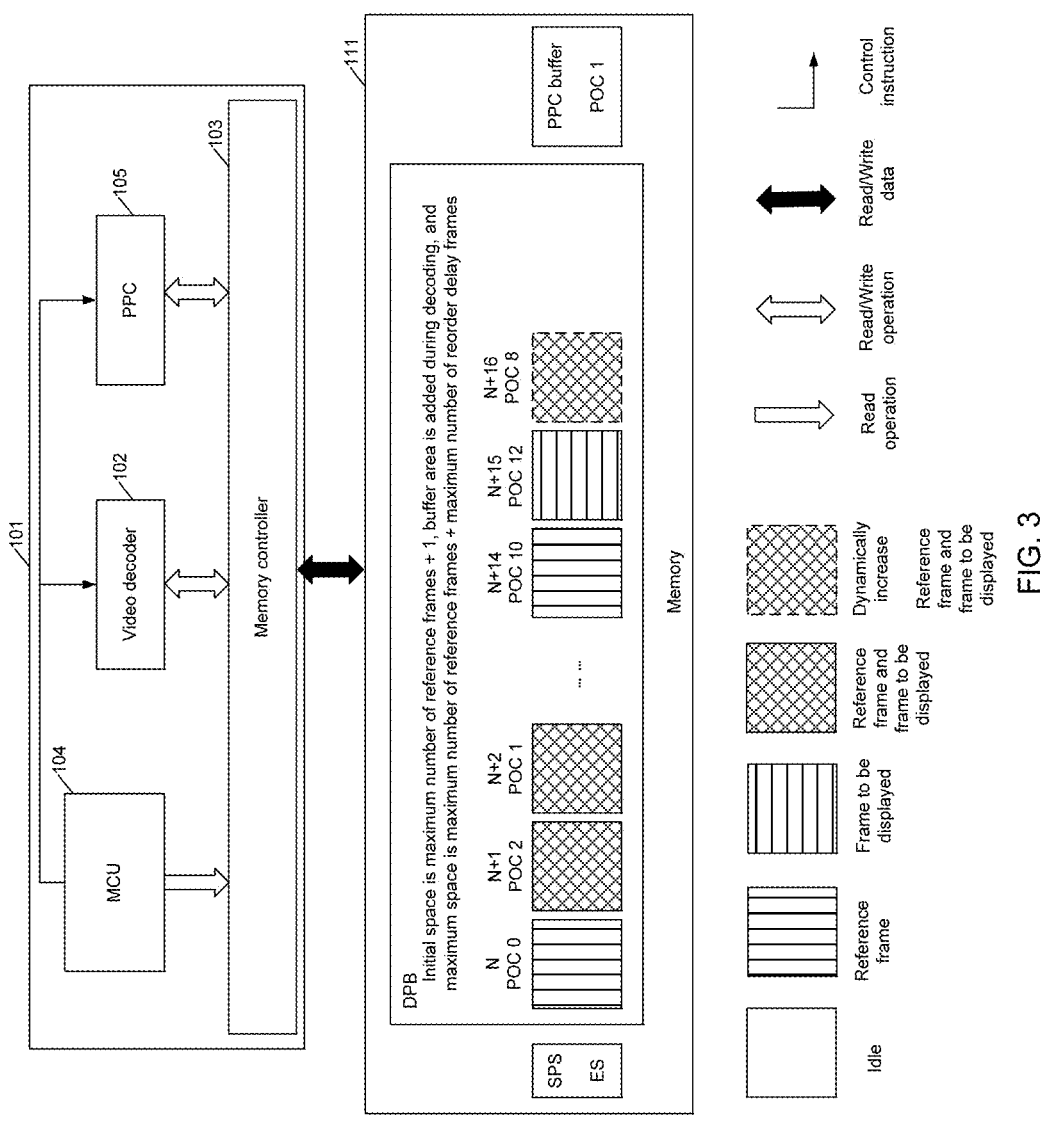
FIG. 3 is a schematic diagram of architecture of a video decoder system according to an embodiment of the present application.

FIG. 3 shows a schematic diagram of architecture of a video decoder system according to an embodiment of the present application. In the video decoder system, the processor 104 sends a decoding control instruction to the video decoder by reading and executing the VDD 115 in the memory 111, and the video decoder 102 decodes the frame in the encoded stream in response to the instruction and stores the decoded image to the DPB 113 of the memory 111. The MCU 104 sends a display processing instruction to the PPC 105 by reading and executing the PPCD 116 in the memory 111, and the PPC 105 performs post processing on the decoded image stored in the DPB 113 in response to the instruction, for example, performing resolution adjustment, rotation or scaling on the decoded image. The MCU 104, the video decoder 102 and the PPC 105 may perform read/write operations on data of the memory 111 by the memory controller 103.

An initial space size of the DPB 113 of the memory 111 is set to be (X+1) picture buffer areas, where X is the maximum number of reference frames, and the picture buffer areas in the DPB 113 are used for storing the decoded image of the frames in the encoded stream. During a decoding process, whether to add a picture buffer area may be determined according to the status information of the DPB 113, for example, increasing the DPB 113 to (X+Y) picture buffer areas, where Y is the maximum number of reorder delay frames. During a decoding process, the tag information of each picture buffer area in the DPB 113 may be updated in real-time according to the RFCI of each frame in the encoded stream and whether the decoded images in the DPB 113 have undergone post processing.

In FIGS. 3, N, N+1, N+2, . . . , and N+16 are decoded images obtained by decoding a frame in the encoded stream according to a decoding order, POC 0, POC 2, POC 1, . . . , and POC 8 represent the POCs of the decoded images. For example, in the DPB 113, (N, POC 0) indicates that a decoded image is obtained by decoding the Nth frame in the encoded stream, and the POC of the decoded image is 1; (N+16, POC 8) indicates that a decoded image is obtained by decoding the (N+16)th frame, and the POC of the decoded image is 9. Moreover, before the (N+16)th frame is decoded, it is made sure that the DPB 113 contains no idle picture buffer areas, and so one picture buffer area is added to expand the DPB 113 (for example, the picture buffer area on the rightmost in the DPB 113 in FIG. 3). The newly added picture buffer area is used to store the decoded image of the (N+16)th frame, and a POC tag is added according to the POC of the decoded image and a reference frame tag is added according to whether the decoded image is to be used as a reference frame for decoding another frame.

In another embodiment, the processor 104 obtains the maximum number (represented as Y) of reorder delay frames of the encoded stream 112 by analyzing the SPS data, and sets the DPB 113 according to the maximum number X of reference frames and the maximum number Y of reorder delay frames. The DPB 113 may include (X+1) to (X+Y) picture buffer areas; that is, the number of picture buffer areas included an initially allocated DPB 113 is greater than or equal to (X+1), and is smaller than or equal to (X+Y), where 1<Y=X. During a decoding process, the processor 104 fully utilizes the buffer areas of the DPB 113 according to the status information of the DPB 113, and improves a utilization rate of the buffer areas in the DPB 113 while ensuring that normal decoding is implemented.

In another embodiment, if the PPC 105 needs to simultaneously process multiple decoded images to be displayed, only when the video decoder 102 has decoded multiple images, the PPC 105 then performs post processing on the multiple decoded images. Thus, V decoded images which can be simultaneously processed by the PPC 105 are stored in the DPB 113. In this case, the processor 104 sets the number of picture buffer areas of the DPB 113 to a sum of the maximum number X of reference frames, the number V of decoded image frames that need to be processed simultaneously and 1, that is, the DPB 113 includes (X+V+1) picture buffer areas. Moreover, during a decoding process, buffer space sizes of the DPB 113 may be dynamically managed by the status information of the DPB 113, so as to achieve more efficient buffer allocation while ensuring the implementation of normal decoding.

In another embodiment, if the PPC 105 needs to simultaneously process multiple decoded images to be displayed in a way that post processing of the previously decoded images cannot be completed while the decoder outputs the decoded images, it is assumed that the processor 105 is required to additionally buffer V decoded images, that is, the number of frames to be displayed that need to be buffered is V. Thus, the processor 105 may set an initial size of the DPB 113 to a sum of the maximum number X of reference frames, the maximum number Y of reorder delay frames, and the number V of decoded image frames that need to be processed simultaneously, that is, the DPB 113 includes (X+Y+V) picture buffer areas. Moreover, during a decoding process, space sizes of buffer areas of the DPB 113 may be dynamically managed according to the status information of the DPB 113, so as to achieve more efficient buffer allocation while ensuring the implementation of normal decoding.

Figure 4A:
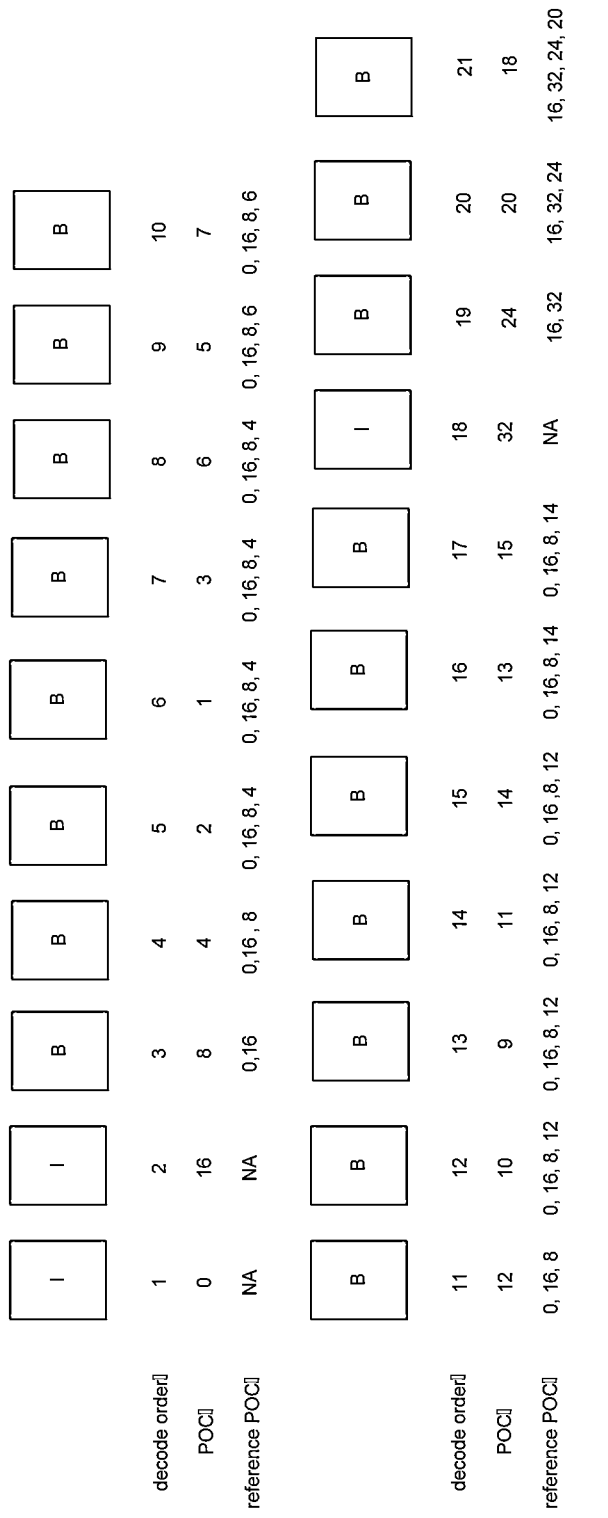
FIG. 4a is a schematic diagram of a reference relationship of an encoded stream sequence according to an embodiment of the present application.

An example is given below to illustrate a process of dynamically managing a DPB during a decoding process of the present application. FIG. 4*a* shows a schematic diagram of an encoded stream sequence according to an embodiment of the present application. The encoded stream sequence includes 21 frames, wherein the SPS states that the maximum number of reference frames (for example, max_ref_num in the drawing) of the encoded stream sequence is 4, and the maximum number of reorder delay frames (for example, reorder delay in the drawing) is 4. FIG. 4*a* shows a decoding order (for example, decoding order in the drawing), a POC (for example, POC in the drawing) and a RPOC (for example, RPOC in the drawing, that is, a reference relationship is indicated according to a display order of decoded images) of each frame. For example, for the $1^{st}$ frame in the encoded stream, the decoding order is 1 and the POC is 0 (indicating that the decoded image is the $1^{st}$ frame to be displayed), the RPOC is NA (indicating that there is no reference frame, that is, decoding of the frame does not involve reference to other frames); for the $5^{th}$ frame in the encoded stream, the decoding order is 5, the POC is 2 (indicating that the decoded image is the $3^{rd}$ frame to be displayed), the RPOC is 0, 16, 8 and 4 (that is, decoding of the frame involves reference to four decoded images respectively having display orders of 0, 16, 8 and 4). Details for other frames can be deduced similarly, and are omitted herein.

Figure 4B:
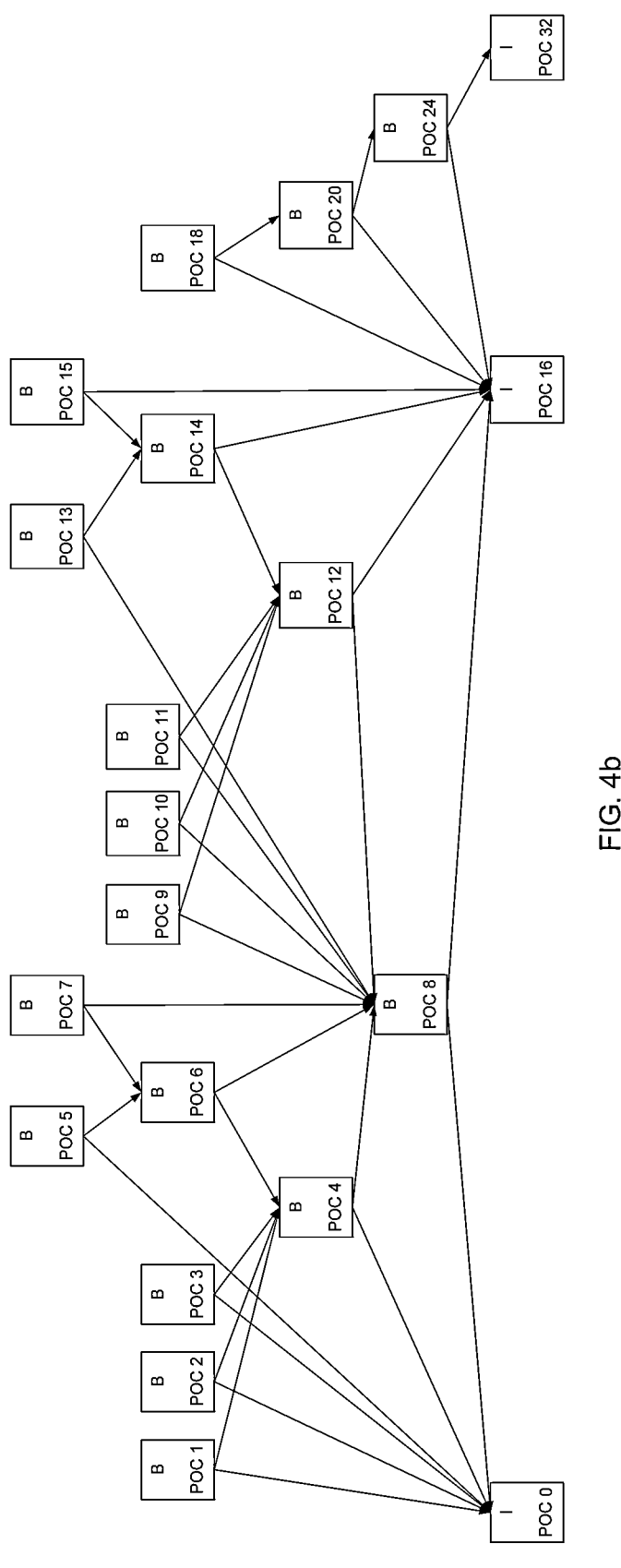
FIG. 4b is a schematic diagram of a reference relationship of another encoded stream sequence according to an embodiment of the present application.

Compared to FIG. 4*a*, FIG. 4*b* shows a reference relationship between a frame and a frame displayed according to POCs of decoded images. For example, in FIG. 4*b*, a frame B with a POC of 8 includes directed arrows pointing to a frame I with POC 0 and a frame I with POC 16 which indicates that the decoding of the frame B involves decoded images of two frames with a POC of 0 and a POC of 16. For a frame B with a POC of 4 includes directed arrows pointing to a frame I with POC 0 and a frame B with POC 8, since the frame B with a POC of 8 includes directed arrows pointing to a frame I with POC 0 and a frame I with POC 16, decoding of the frame B with a POC of 4 involves decoded images of the three frames respectively with POCs of 0, 16 and 8. Similar details of the display orders and reference frames of each the remaining frames are omitted herein.

Figure 4C:
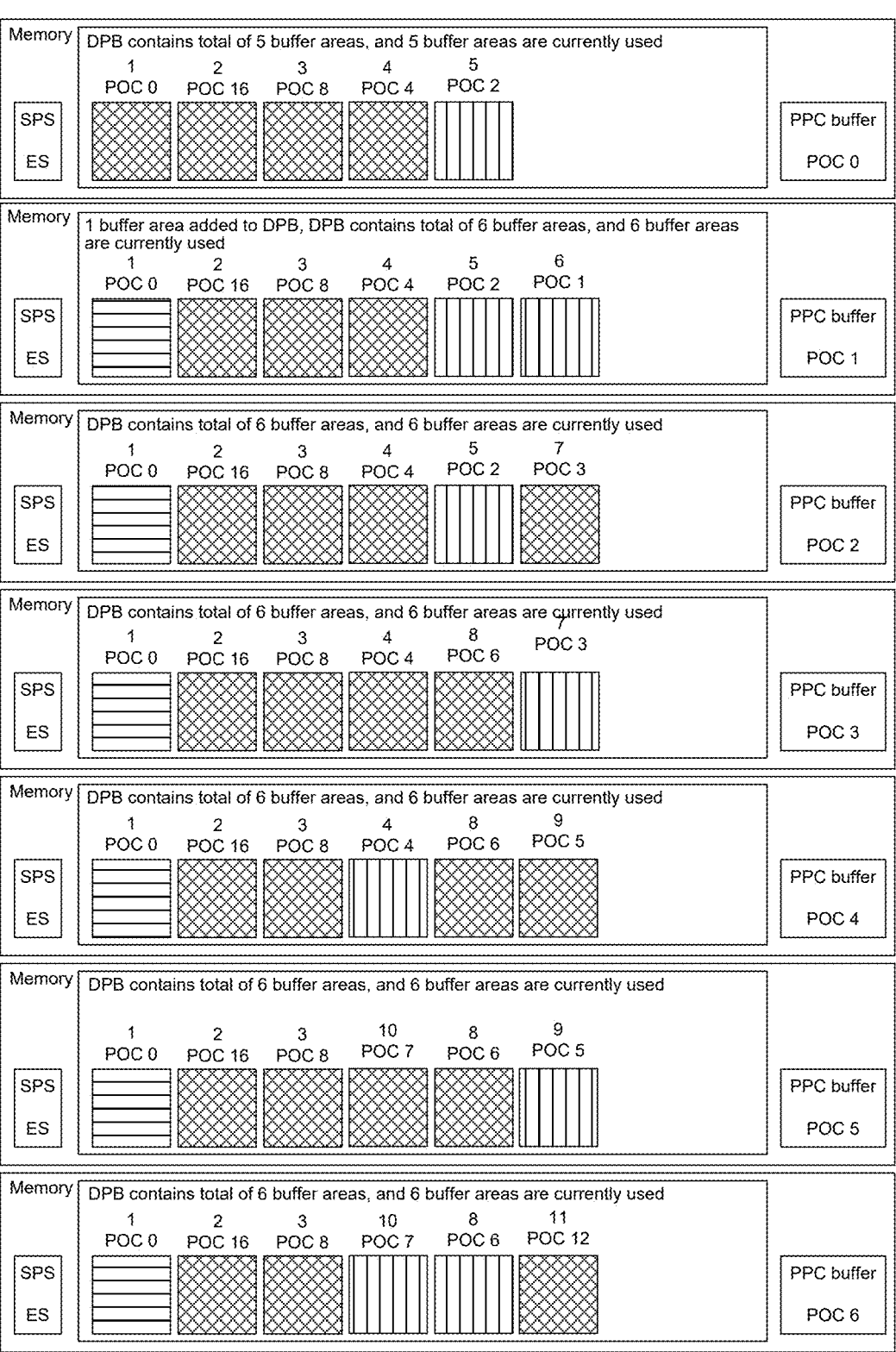
FIG. 4c is a schematic diagram of buffer management during a decoding process of $5^{th}$ to $11^{th}$ frames in an encoded stream sequence according to an embodiment of the present application.
Figure 4D:
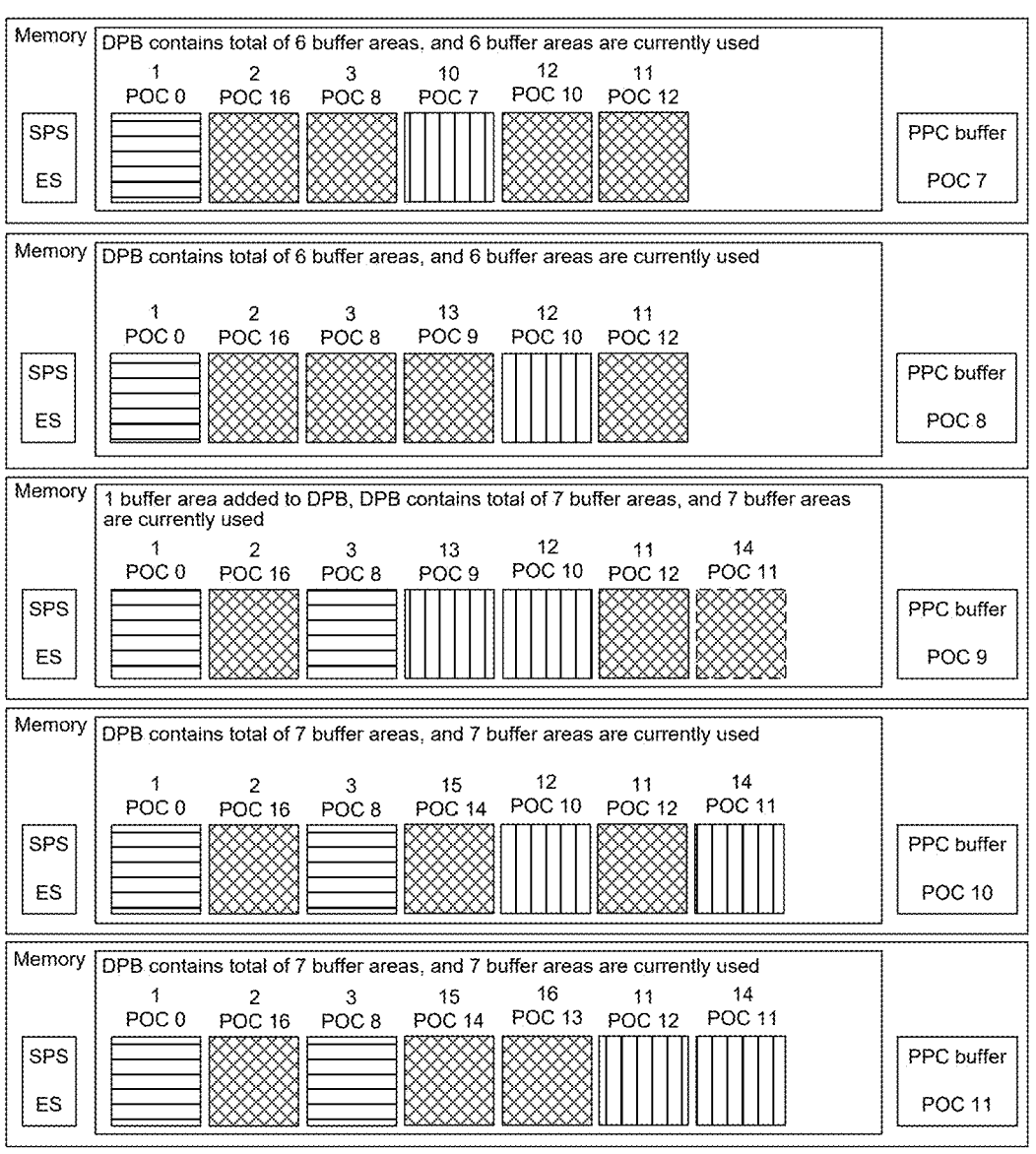
FIG. 4d is a schematic diagram of buffer management during a decoding process of $12^{th}$ to $16^{th}$ frames in an encoded stream sequence according to an embodiment of the present application.
Figure 4E:
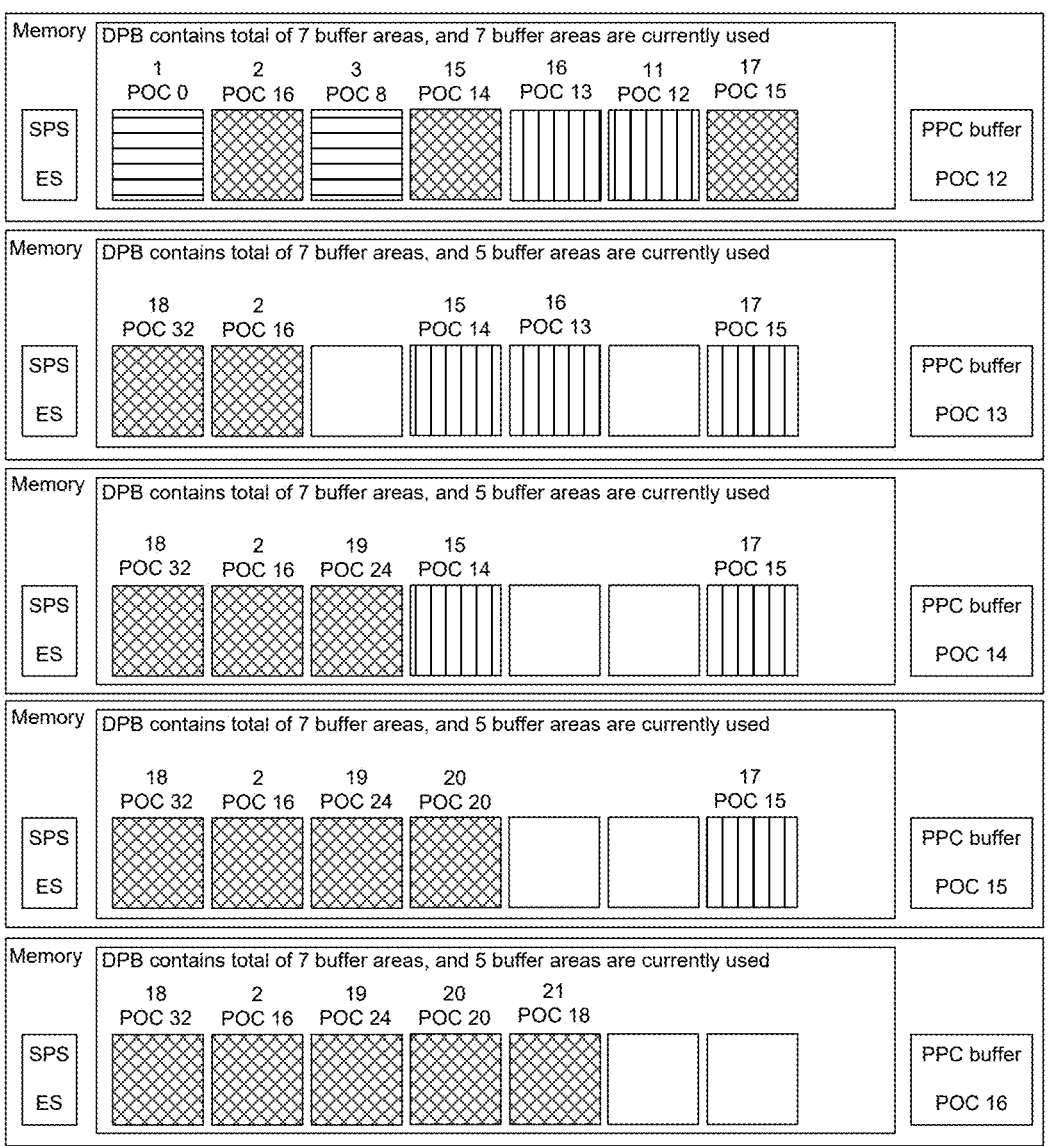
FIG. 4e is a schematic diagram of buffer management during a decoding process of $17^{th}$ to $21^{st}$ frames in an encoded stream sequence according to an embodiment of the present application.

For the examples shown in FIG. 4*a* and FIG. 4*b*, the processor 104 initially sets the buffer space of the DPB according to the maximum number 4 of reference frames to 5 (that is, 4+1) picture buffer areas. Since the maximum number of reorder delay frames is 4, at least four decoded images of the encoded stream needed to be decoded before the decoded images are displayed, and so the decoded image with a POC of 0 in the decoded images is displayed only when the $5^{th}$ frame in the encoded stream is decoded, that is, the decoding process of the $5^{th}$ frame is performed simultaneously with the displaying process of the decoded image with a POC of 0. FIG. 4*c* depicts such starting point for illustrating the decoding process. FIG. 4*c* to FIG. 4*e* show schematic diagrams of a management process of a DPB during decoding of an encoded stream.

Decoding of the $5^{th}$ Frame:

The $5^{th}$ frame is used as a current frame, and the previous 4 decoded images have occupied 4 picture buffer areas in the DPB before the $5^{th}$ frame is decoded. According to the reference relationship shown in FIG. 4*a* or FIG. 4*b*, all of the tag information of the previous 4 picture buffer areas includes the POC tags and the reference frame tags. From the encoded stream, an compressed image and RFCI of the $5^{th}$ frame (the reference frames of the $5^{th}$ frame include four decoded images with POCs of 0, 16, 8 and 4), and POCs of the decoded images and information of the decoded images used as reference frames (the RFCI of the $5^{th}$ frame, the POC of the decoded images and the information of the decoded images used as reference frames may be included in data of the compressed image are obtained. Decoding of the $5^{th}$ frame does not involve updating of reference frame tags in the tag information of the 4 previous picture buffer areas, and the tag information of the picture buffer areas is kept unchanged. Since the DPB at this point still contains an idle picture buffer areas (that is, the $5^{th}$ picture buffer area having tag information that is empty), the $5^{th}$ picture buffer are may then be used to store the decoded image of the $5^{th}$ frame. Next, the $5^{th}$ frame is decoded, the decoded image of the $5^{th}$ frame is stored to the $5^{th}$ picture buffer area, the tag information of the $5^{th}$ picture buffer area is set to include a POC tag according to the POC of the decoded image of the $5^{th}$ frame, and a correlation relationship between POC 2 of the decoded image of the $5^{th}$ frame and the $5^{th}$ picture buffer area is added to the status information of the DPB.

When decoding of the $5^{th}$ frame is completed, in the status information of the DPB, the number of picture buffer areas including the POCs is 5 (5 is greater than Y (Y=4)). At this point, the decoded image with the smallest POC of the decoded images in the DPB is determined, that is, the decoded image tagged by POC 0 is selected. The PPC 105 obtains the decoded image from the picture buffer area corresponding to the POC 0, processes the decoded image and stores the processed decoded image to the PPC buffer for further display. The PPC 105 sends an command (for example, an interrupt) to the processor 104 when the decoded image is completely read, and the processor 104 clears the POC tag in the tag information of the $1^{st}$ picture buffer area in response to the command At this point, the tag information of the $1^{st}$ picture buffer area includes only reference frame tags, and the tag information of the $2^{nd}$ to $4^{th}$ picture buffer areas stay unchanged.

Decoding of the $6^{th}$ Frame:

From the encoded stream, compressed data, RFCI of the $6^{th}$ frame (reference frames of the $6^{th}$ frame are decoded images respectively with POCs of 0, 16, 8 and 4), and POCs of the decoded images and information of the decoded images to be used as reference frames are obtained (or reference frames, POCs of decoded images and information of the decoded images to be used as reference frames are obtained from compressed data), and it is determined according to the RFCI that the reference frame tag of each of the picture buffer areas in the DPB does not need to be updated. At this point, the tag information of none of 5 picture buffer areas in the DPB is empty, that is, the DPB does not contain any idle image buffer, and one picture buffer area (that is, a $6^{th}$ picture buffer area) needs to be added so as to expand the DPB. Moreover, the decoded image of the $6^{th}$ frame is stored to the newly added picture buffer (that is, the $6^{th}$ picture buffer area). Next, the $6^{th}$ frame is decoded, the decoded image of the $6^{th}$ frame is stored to the $6^{th}$ picture buffer area, the tag information of the $6^{th}$ picture buffer area is set to include a POC tag according to the POC of the decoded image and information of not being used as a reference frame, and a correlation relationship between POC 1 of the decoded image and the $6^{th}$ picture buffer area is added to the status information of the DPB. At this point, the status information of the DPB includes 5 POC tags, and the decoded image with the smallest POC in the decoded images tagged is determined, that is, the decoded image tagged by POC 1. The PPC 105 obtains and processes the decoded image from the $6^{th}$ picture buffer area corresponding to POC 1, and stores the processed decoded image to the PPC buffer for further display. The PPC 105 sends a command to the processor 104 when the decoded image is completely read, and the processor 104 clears the POC tag in the tag information of the $6^{th}$ picture buffer area in response to the command. As such, the tag information of the $6^{th}$ picture buffer area is empty, that is, the $6^{th}$ picture buffer area is in an idle state.

Decoding of the $7^{th}$ Frame:

From the encoded stream, compressed data and RFCI of the $7^{th}$ frame are obtained, POCs of the decoded images and information of the decoded image not to be used as a reference frame are obtained, it is determined according to the RFCI of the $7^{th}$ frame (the reference frames of the $7^{th}$ frame includes decoded images with POCs of 0, 16, 8 and 4) that the reference frame tag of each of the picture buffer areas in the DPB does not need to be updated, and it is determined that the tag information of 1 (that is, the $6^{th}$) picture buffer area in the DPB is empty, that is, the $6^{th}$ picture buffer area is idle. Next, the $7^{th}$ frame is decoded, the decoded image of the $7^{th}$ frame is stored to the $6^{th}$ picture buffer area, the tag information of the $7^{th}$ picture buffer area is set to include a POC tag according to the POC of the decoded image and not being used as a reference frame, and a correlation relationship between POC 3 of the decoded image and the $6^{th}$ picture buffer area is added to the status information of the DPB.

When decoding of the $7^{th}$ frame is completed, in the status information of the DPB, the number of picture buffer areas including the POC tag is 5, the decoded image with the smallest POC tag of the decoded images in the DPB is determined (the decoded image tagged by POC 2), the PPC 105 obtains and processes the decoded image from the $5^{th}$ picture buffer area corresponding to POC 2, and stores the processed decoded image to the PPC buffer for further display. In response to a command indicating that the decoded image is completely read as sent by the PPC 105, the processor 104 clears the POC tag in the tag information of the $5^{th}$ picture buffer area. As such, the tag information of the $5^{th}$ picture buffer area is empty, that is, the $5^{th}$ picture buffer area is in an idle state.

For decoding of the $8^{th}$ frame, related details of a specific decoding process can be referred from the description on the $7^{th}$ frame. The differences are, the decoded image of the $8^{th}$ frame is stored to the $5^{th}$ picture buffer area, the tag information of the $5^{th}$ picture buffer area is set to include a POC tag and a reference frame tag according to the POC of the decoded image and information of the decoded image used as a reference frame, and a correlation relationship of POC 6 of the decoded image, the reference frame and the $5^{th}$ picture buffer area is added to the status information of the DPB.

During decoding of the $8^{th}$ frame, the PPC 105 sequentially reads and processes the decoded images tagged by POC 3 from the picture buffer areas in the DPB for further display. When the decoded image is completely read, the processor 104 updates (eg, to set with an empty value) the POC tag in the tag information of the picture buffer area.

Details of decoding of the following $9^{th}$ frame in the encoded frame may be understood from the description of the decoding of the $5^{th}$ to $8^{th}$ frames, and are omitted herein.

It is shown from a combination of FIG. 4c, FIG. 4d and FIG. 4e that, decoding of the $1^{st}$ frame to the $21^{st}$ frame in the encoded stream has satisfied the requirements of an encoded stream sequence with the maximum number 4 of reference frames and the maximum number 4 of reorder delay frames. Moreover, the maximum number of picture buffer areas of the DPB is 7 during decoding of the $14^{th}$ to 17 frames. Compared to initially used 5 picture buffer areas of the DPB, the picture buffer areas are increased by 2, which are respectively for decoding the $6^{th}$ frame and the $14^{th}$ frame. Compared to 9 (that is, X+Y+1) picture buffer areas initially allocated as in the prior art, the picture buffer areas occupied by the DPB can be reduced.

Figure 5A:
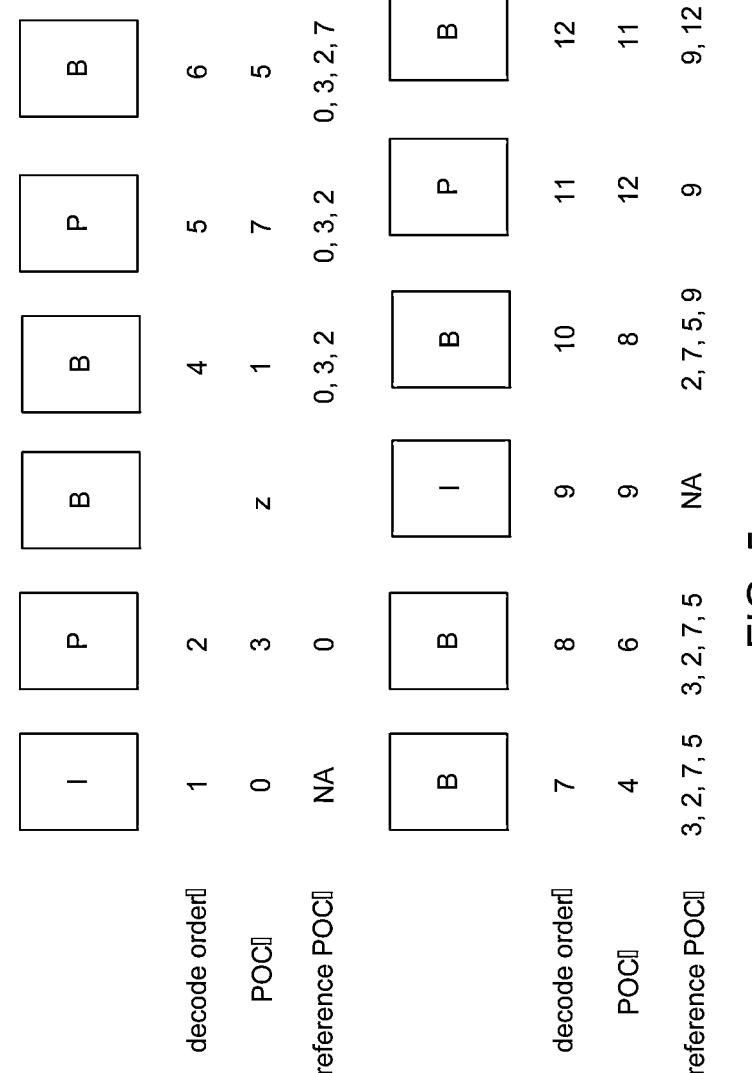
FIG. 5a is a schematic diagram of a reference relationship of another encoded stream sequence according to an embodiment of the present application.

FIG. 5a shows a schematic diagram of another encoded stream sequence according to an embodiment of the present application. The encoded stream sequence includes 12 frames, wherein the SPS includes the maximum number 4 of reference frames and the maximum number 2 of reorder delay frames. FIG. 5a shows a decoding order, a POC and RPOC (that is, a reference relationship) of each frame. A person of ordinary skill in the art would be able to understand the details of each frame in the encoded stream in FIG. 5 from the description associated with FIG. 4a above, and such repeated description is omitted herein.

Figure 5B:
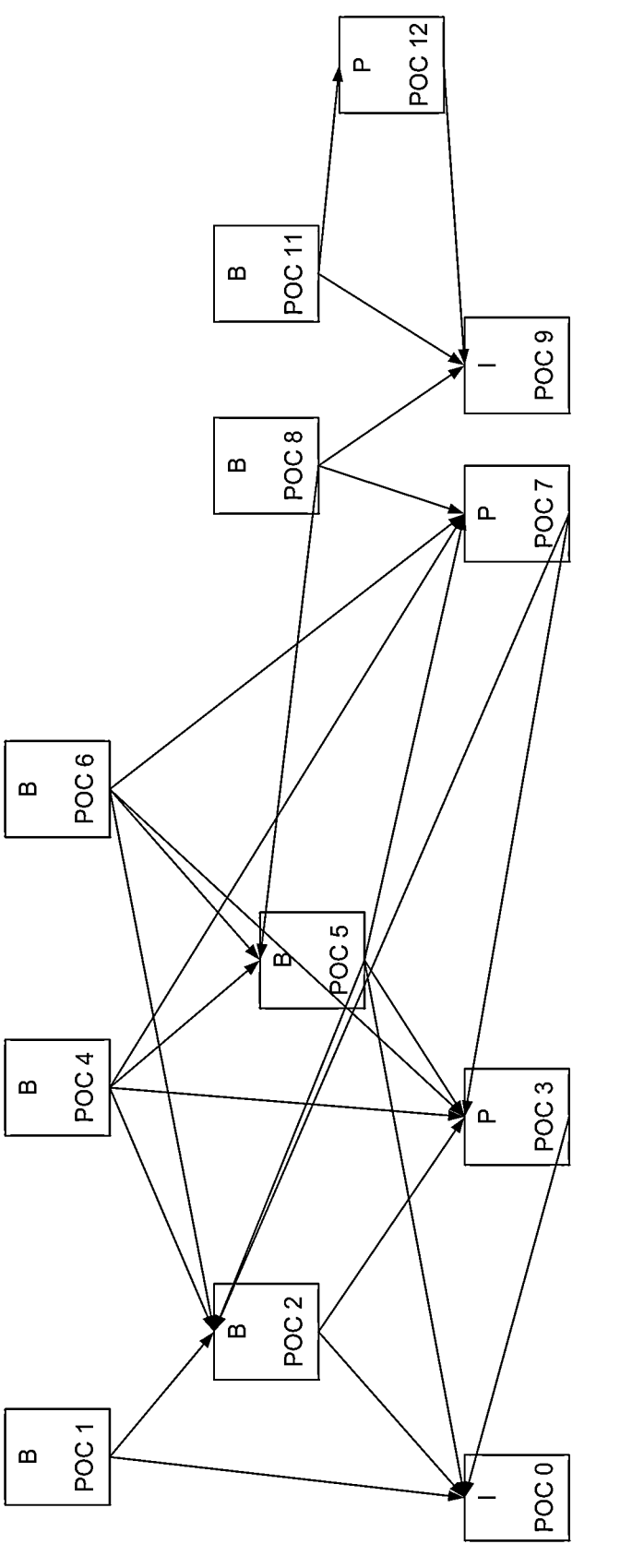
FIG. 5b is a schematic diagram of a reference relationship of yet another encoded stream sequence according to an embodiment of the present application.

FIG. 5b shows a reference relationship between a frame and a frame displayed according to POCs of decoded images. A person of ordinary skill in the art would be able to understand the details of each frame in FIG. 5b from the description associated with FIG. 4b above, and such repeated description is omitted herein.

Figure 5C:
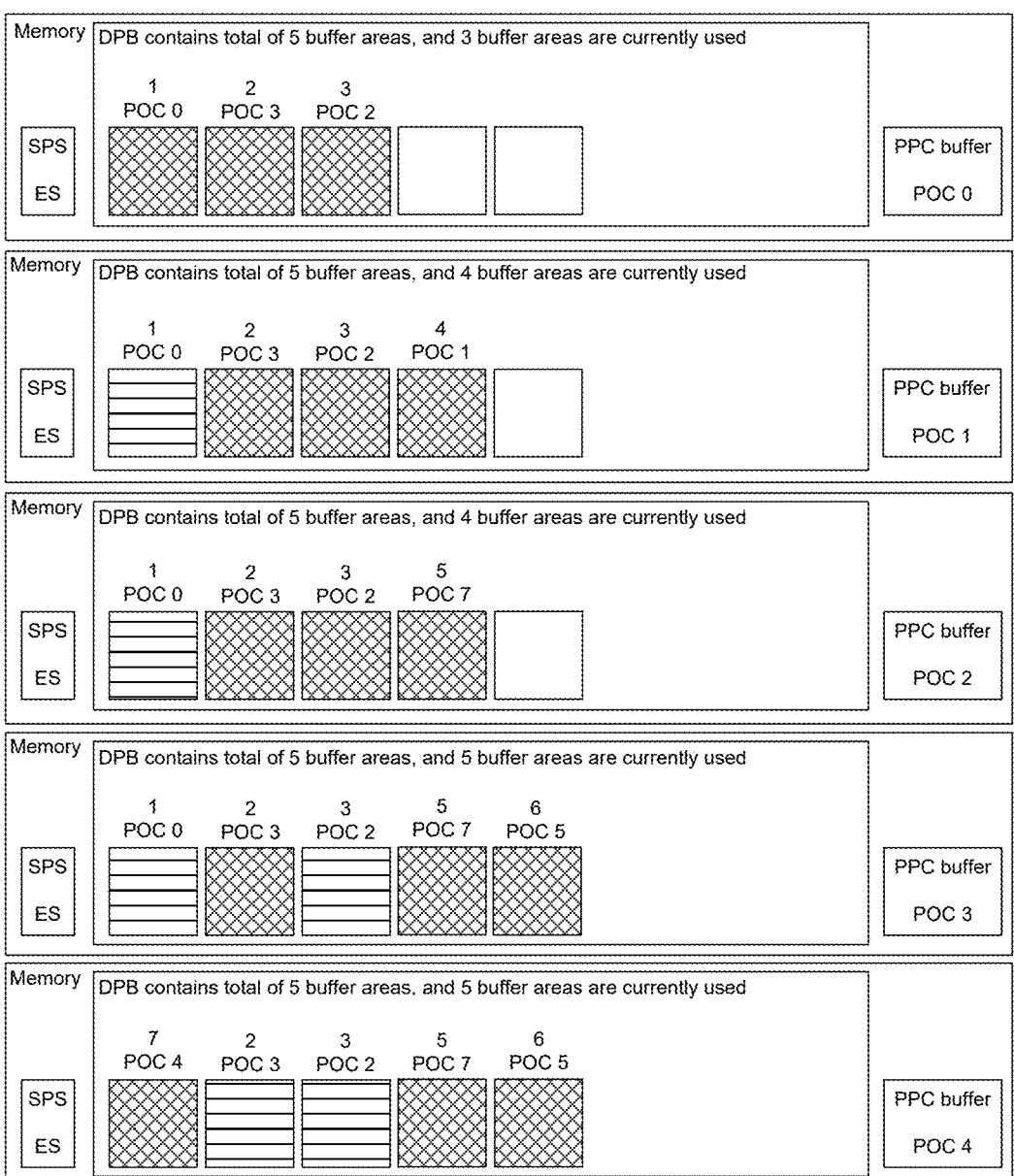
FIG. 5c is a schematic diagram of buffer management during a decoding process of $3^{rd}$ to $7^{th}$ frames in an encoded stream sequence according to an embodiment of the present application.

In this embodiment, the processor 104 sets the initial picture buffer space of the DPB to be 5 picture buffer areas according to the maximum number 4 of reference frames. Since the maximum number of reorder delay frames is 2, at least 2 decoded images needed to be decoded from the encoded stream before the decoded images are displayed, and so the decoded image with a POC of 0 in the decoded image is displayed only when the $3^{rd}$ frame in the decoded encoding stream is decoded. FIG. 5c depicts such starting point for illustrating the decoding process.

In some embodiments (for example, for decoding according to the HEVC or AVC standard), $1 \leq X \leq 16$ and $1 \leq Y \leq X$.

Figure 5D:
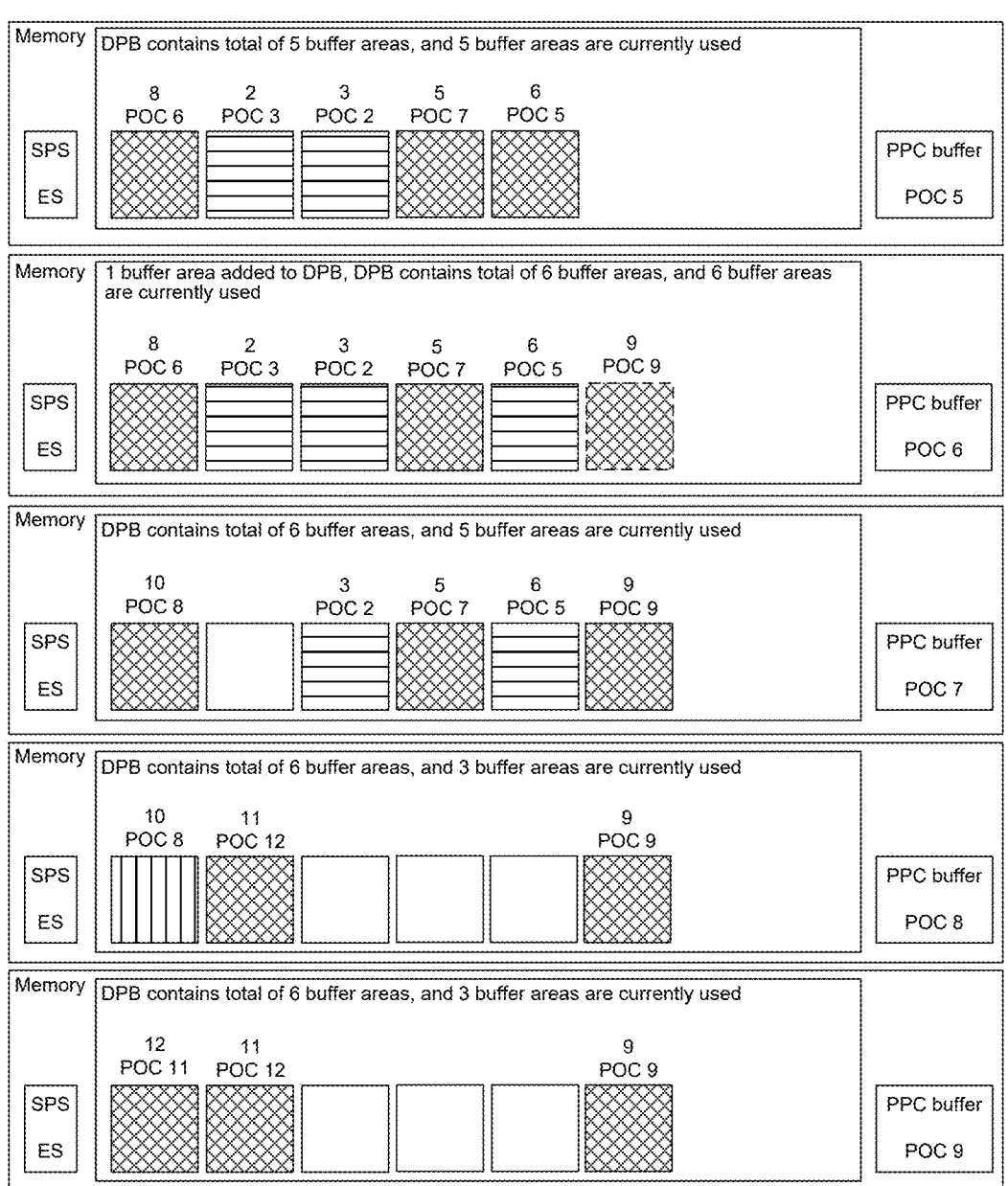
FIG. 5d is a schematic diagram of buffer management during a decoding process of $8^{th}$ to $12^{th}$ frames in an encoded stream sequence according to an embodiment of the present application.

A person of ordinary skill in the art would be able to understand the details of decoding of each frame in FIG. 5c to FIG. 5d from the description associated with FIG. 4c to FIG. 4e above, and thus details of decoding of the frames in the encoded stream are omitted herein.

Compared to the embodiment in FIG. 4, the maximum number of reference frames of the encoded stream in the embodiment in FIG. 5 is similarly 4 but the maximum number of reorder delay frames is 2, and so a maximum of 6 frames are stored in the picture buffer areas of the DPB during decoding. The above takes place during decoding of the $9^{th}$ and $11^{th}$ frames, that is, the DPB requires a maximum of only (X+2) picture buffer areas. Compared to 7 (that is, X+Y+1) picture buffer areas initially allocated as in the prior art, the number of the picture buffer areas is reduced by 1.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded with the broadest interpretation so as to encompass all such modifications.

What is claimed is:

1. A video decoding method, applied to a decoder device to decode an encoded stream stored in a memory, the decoder device comprising a video decoder, a memory controller and a processor; the video decoding method comprising:

setting, by the memory controller, a decoded picture buffer in the memory according to a maximum number X of reference frames of the encoded stream, wherein the decoded picture buffer comprises (X+1) picture buffer areas, and each of the picture buffer areas is used to store a decoded image, where X is a positive integer;

determining, according to status information of the decoded picture buffer, a picture buffer area in the decoded picture buffer that is idle;

controlling the video decoder to decode a current frame in the encoded stream so as to obtain a decoded image of the current frame;

storing the decoded image of the current frame to the picture buffer area that is idle; and when it is determined, according to the status information of the picture buffer area, that there is no idle picture buffer area in the decoded picture buffer, adding an added picture buffer area to expand the decoded picture buffer, wherein the added picture buffer area is used to store the decoded image of the current frame.

2. The video decoding method according to claim 1, wherein the status information of the decoded picture buffer comprises tag information of each of the picture buffer areas, the tag information comprises a picture order count tag and a reference frame tag of the decoded image stored in the decoded picture buffer, and the video decoding method further comprises:

obtaining reference frame control information from the encoded stream; and updating the reference frame tag of the decoded image stored in the decoded picture buffer according to the reference frame control information, so as to update the tag information of each of the picture buffer areas in the decoded picture buffer.

3. The video decoding method according to claim 2, wherein the determining, according to status information of the decoded picture buffer, an idle picture buffer area in the decoded picture buffer comprises:

when the tag information of one of the picture buffer areas is empty, determining that the decoded picture buffer comprises the idle picture buffer area.

4. The video decoding method according to claim 2, further comprising:

correspondingly generating at least one of a picture order count tag and a reference frame tag according to a picture order count tag of the decoded image of the current frame and information of the decoded image of the current frame to be used as a reference frame, and accordingly updating tag information of the picture buffer area storing the decoded image of the current frame.

5. The video decoding method according to claim 4, further comprising:

displaying the decoded image stored in the decoded picture buffer, and accordingly updating the picture order count tag in the tag information of the picture buffer area storing the decoded image.

6. The video decoding method according to claim 1, further comprising:

reading, according to a maximum number Y of reorder delay frames of the encoded stream and a picture order count tag included in tag information of each of the picture buffer areas, the decoded image to be currently displayed from the decoded picture buffer; and clearing a picture order count of the picture buffer area storing the decoded image to be currently displayed, where Y is a positive integer.

7. The video decoding method according to claim 1, wherein the setting of the decoded picture buffer according to the maximum number X of reference frames of the encoded stream comprises:

setting the decoded picture buffer according to the maximum number X of reference frames and a maximum number Y of reorder delay frames of the encoded stream, wherein a number of picture buffer areas included in the decoded picture buffer is greater than or equal to (X+1) and is smaller than or equal to (X+Y), and X>=Y>1, where Y is a positive integer.

8. A decoder device, applied to decode an encoded stream stored in a memory, the decoder device comprising a video decoder, a memory controller and a processor, wherein the processor is configured to:

set, by the memory controller, a decoded picture buffer in the memory according to a maximum number X of reference frame of the encoded stream, wherein the decoded picture buffer comprises (X+1) picture buffer areas, and each of the picture buffer areas is used to store a decoded image, where X is a positive integer;

determine, according to status information of the decoded picture buffer, a picture buffer area in the decoded picture buffer that is idle; and control the video decoder to decode a current frame in the encoded stream so as to obtain a decoded image of the current frame, and store the decoded image of the current frame to the picture buffer area that is idle, wherein when it is determined according to the status information of the picture buffer area that there is no idle picture buffer area in the decoded picture buffer, the processor adds an added picture buffer area to expand the decoded picture buffer, wherein the added picture buffer area is used to store the decoded image of the current frame.

9. The decoder device according to claim 8, wherein the status information of the decoded picture buffer comprises tag information of each of the picture buffer areas, the tag information comprises a picture order count tag and a reference frame tag of the decoded image stored in the decoded picture buffer, and the processor is further configured to:

obtain reference frame control information from the encoded stream; and update the reference frame tag of the decoded image stored in the decoded picture buffer according to the reference frame control information, so as to update the tag information of each of the picture buffer areas in the decoded picture buffer.

10. The decoder device according to claim 9, wherein when the tag information of one of the picture buffer areas is empty, the processor determines that the decoded picture buffer comprises the picture buffer area that is idle.

11. The decoder device according to claim 9, wherein the processor generates at least one of a picture order count tag and a reference frame tag according to a picture order count tag of the decoded image of the current frame and information of the decoded image of the current frame to be used as a reference frame, and accordingly updating tag information of the picture buffer area storing the decoded image of the current frame.

12. The decoder device according to claim 11, wherein the processor is configured to:

display the decoded images stored in the decoded picture buffer, and accordingly update the picture order count tag in the tag information of the picture buffer area storing the decoded image.

13. The decoder device according to claim 8, wherein the processor is configured to:

read, according to a maximum number Y of reorder delay frames of the encoded stream and a picture order count tag included in tag information of each of the picture buffer areas, the decoded image to be currently displayed from the decoded picture buffer; and clear a picture order count of the picture buffer area storing the decoded image to be currently displayed, where Y is a positive integer.

14. The decoder device according to claim 8, wherein the processor is configured to:

set the decoded picture buffer according to the maximum number X of reference frames and a maximum number Y of reorder delay frames of the encoded stream, wherein a number of picture buffer areas included in the decoded picture buffer is greater than or equal to (X+1) and is smaller than or equal to (X+Y), and X>=Y>1, where Y is a positive integer.

* * * * *